US010283764B2

(12) United States Patent
Lee et al.

(10) Patent No.: US 10,283,764 B2
(45) Date of Patent: May 7, 2019

(54) POSITIVE ELECTRODE ACTIVE MATERIAL FOR SECONDARY BATTERY AND SECONDARY BATTERY INCLUDING SAME

(71) Applicant: LG Chem, Ltd., Seoul (KR)

(72) Inventors: Dae Jin Lee, Daejeon (KR); Wang Mo Jung, Daejeon (KR); Sin Young Park, Daejeon (KR)

(73) Assignee: LG Chem, Ltd. (KR)

(*) Notice: Subject to any disclaimer, the term of this patent is extended or adjusted under 35 U.S.C. 154(b) by 165 days.

(21) Appl. No.: 15/362,139

(22) Filed: Nov. 28, 2016

(65) Prior Publication Data
US 2017/0155133 A1   Jun. 1, 2017

(30) Foreign Application Priority Data

Nov. 30, 2015  (KR) .................. 10-2015-0169154
Nov. 25, 2016  (KR) .................. 10-2016-0158336

(51) Int. Cl.
| | | |
|---|---|---|
| *H01M 4/36* | (2006.01) | |
| *H01M 4/505* | (2010.01) | |
| *H01M 4/525* | (2010.01) | |
| *H01M 4/04* | (2006.01) | |
| *H01M 4/1391* | (2010.01) | |
| *H01M 4/62* | (2006.01) | |
| *H01M 10/052* | (2010.01) | |

(52) U.S. Cl.
CPC ......... *H01M 4/366* (2013.01); *H01M 4/0471* (2013.01); *H01M 4/1391* (2013.01); *H01M 4/505* (2013.01); *H01M 4/525* (2013.01); *H01M 4/62* (2013.01); *H01M 10/052* (2013.01)

(58) Field of Classification Search
CPC ..................... H01M 4/1391; H01M 4/366
USPC ..................................................... 429/223
See application file for complete search history.

(56) References Cited

U.S. PATENT DOCUMENTS

| | | |
|---|---|---|
| 2004/0200998 A1 | 10/2004 | Park et al. |
| 2008/0248400 A1 | 10/2008 | Hwang et al. |
| 2015/0221978 A1* | 8/2015 | Murota ............... H01M 4/505 429/320 |

FOREIGN PATENT DOCUMENTS

| | | |
|---|---|---|
| KR | 20030083476 A | 10/2003 |
| KR | 20080090157 A | 10/2008 |

OTHER PUBLICATIONS

Halil Sahan et al., "Improvement of the electrochemical performance of LiMn2O4 cathode active material by lithium borosilicate (LBS) surface coating for lithium-ion batteries", Journal of Alloys and Compounds, Jan. 2011, vol. 509, pp. 4235-4241.

* cited by examiner

*Primary Examiner* — James M Erwin
(74) *Attorney, Agent, or Firm* — Lerner, David, Littenberg, Krumholz & Mentlik, LLP

(57) ABSTRACT

A positive electrode active material for a secondary battery and a secondary battery including the same are provided. The positive electrode active material for a secondary battery includes on the surface of a core, a surface treatment layer composed of a B and Si-containing amorphous oxide, and thus may exhibit reduced moisture reactivity, improved thermal and chemical stability, and high-voltage stability.

20 Claims, 6 Drawing Sheets

POSITIVE ELECTRODE ACTIVE MATERIAL FOR SECONDARY BATTERY AND SECONDARY BATTERY INCLUDING SAME

CROSS-REFERENCE TO RELATED APPLICATION(S)

This application claims the benefit under 35 U.S.C. § 119(a) of a Korean patent application filed on Nov. 30, 2015 in the Korean Intellectual Property Office and assigned Serial number 10-2015-0169154, and a Korean patent application filed on Nov. 25, 2016 in the Korean Intellectual Property Office and assigned Serial number 10-2016-0158336, the entire disclosure of which is hereby incorporated by reference.

TECHNICAL FIELD

The present disclosure relates to a positive electrode active material for secondary batteries which may exhibit excellent lifetime properties and high-voltage stability, and a secondary battery comprising the same.

BACKGROUND

Demand for secondary batteries as an energy source is rapidly increasing due to the increase in technological development and demand for mobile devices. Among such secondary batteries, lithium secondary batteries, which have a high energy density and voltage, a long lifetime, and a low self discharge rate, have been commercialized and are widely used.

However, lithium secondary batteries have a limitation in which repeated charge/discharge cycles dramatically reduce the lifetime of the batteries. In particular, the limitation is more severe in long-lifetime or high-voltage batteries. This is due to effects which are generated when moisture inside the batteries and the like causes electrolyte decomposition or active material degradation, as well as an increase in the internal resistance of the battery. In particular, in the case of positive electrode materials, when deterioration of the positive electrode material itself increases in severity, the elution of constituent elements from the positive electrode active material increases, and consequently, the lifetime of the battery decreases sharply or the battery becomes unusable at high voltages.

In order to overcome such limitations, methods for forming a surface treatment layer on the surface of the positive electrode active material have been proposed. Among these, aluminum-based surface treatment layers, which are recognized for stability under high voltage and in electrolyte solutions, are coated—in a crystalline state—on the surfaces of particles, and are thus difficult to apply uniformly over the entirety of the active material Moreover, there is a limitation of increased resistance due to the crystallinity of the aluminum-based compound itself. Boron (B)-based coatings are uniformly coated in an amorphous state and thus do not hinder the movement of lithium ions from a positive electrode material to an electrolyte solution. However, boron-based coatings react with moisture, and thus have a limitation in which the boron-based coating is unable to function as a coating layer if the reaction is extended for a long period of time.

Accordingly, there is a critical demand for the development of a positive electrode active material that can overcome such limitations while improving lithium secondary battery performance.

SUMMARY

Accordingly, an aspect of the present disclosure is to provide a positive electrode active material for secondary batteries, wherein the positive electrode active material has reduced moisture reactivity and improved thermal and chemical stability, and thus may exhibit excellent lifetime properties and high-voltage stability, and a method for preparing the same.

Another aspect of the present disclosure is to provide a positive electrode for secondary batteries which comprises the positive electrode active material, a lithium secondary battery, a battery module, and a battery pack.

In accordance with an aspect of the present disclosure, a positive electrode active material for a secondary battery is provided. The positive electrode active material for a secondary battery comprises a core including a lithium nickel manganese cobalt oxide; and a surface treatment layer positioned on the surface of the core, wherein the surface treatment layer includes a boron (B) and silicon (Si)-containing amorphous oxide.

In accordance with another aspect of the present disclosure, a method for preparing the positive electrode active material is provided. The method includes a first operation for using a boron-containing raw material and a silicon-containing raw material to form a boron and silicon-containing amorphous oxide; and a second operation for mixing the amorphous oxide with a lithium nickel manganese cobalt oxide and then heat treating to form a surface treatment layer including the amorphous oxide on a core including the lithium nickel manganese cobalt oxide.

In accordance with another aspect of the present disclosure, a positive electrode for a secondary electrode, a lithium secondary battery, a battery module, and a battery pack are provided. The positive electrode for a secondary electrode, the lithium secondary battery, the battery module, and the battery pack include the positive electrode active material.

Specific features of other aspects of the present disclosure are included in the detailed description below.

BRIEF DESCRIPTION OF THE DRAWINGS

The drawings herein illustrate exemplary embodiments of the present disclosure, and together with the description, serve to better explain the technical concept of the present disclosure. Thus, the present disclosure should not be construed as limited to the features illustrated in the drawings.

DETAILED DESCRIPTION

Figure 1:
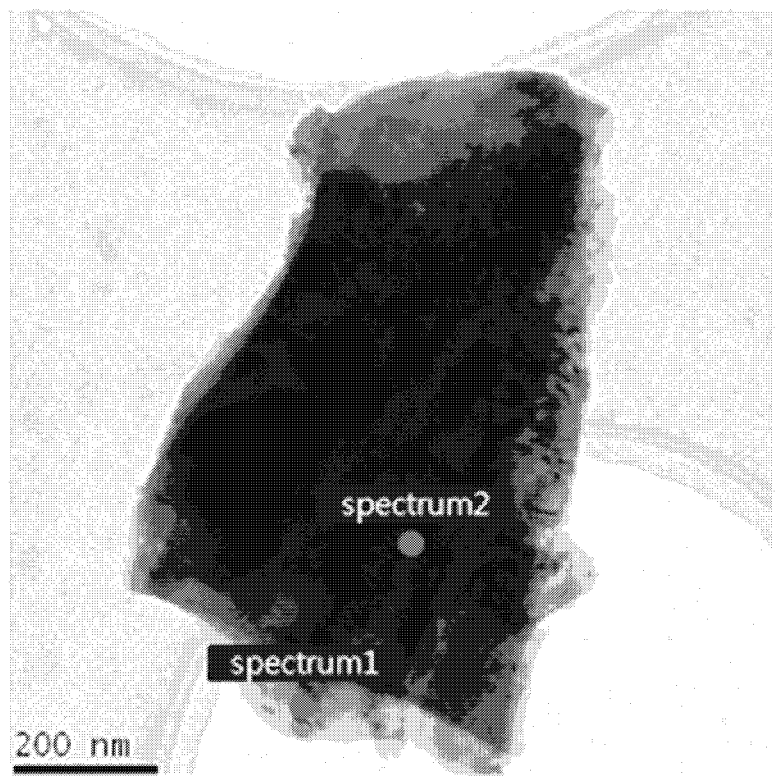
FIG. 1 is a transmission electron microscopy (TEM) image of a positive electrode active material in Example 1-1.

Hereinafter, the present disclosure is described in greater detail to facilitate understanding thereof.

The wordings or terms used in the specification and claims are not limited to their typical or dictionary definitions. Rather wordings or terms as used herein are to be understood as defined by the inventor to best convey the technical concepts of the present disclosure.

A positive electrode active material for lithium secondary batteries according to an embodiment of the present disclosure comprises a core including a lithium nickel manganese cobalt oxide, and a surface treatment layer positioned on the surface of the core, wherein the surface treatment layer includes an amorphous oxide containing boron (B) and silicon (Si).

The amorphous oxide may specifically be an amorphous oxide glass having lithium ion conductivity, and more specifically, may be a borosilicate-based glass, an alkaliborosilicate-based glass, or an aluminoborosilicate-based glass, and the like. Accordingly, the surface treatment layer may include one or two or more of the oxide glasses.

By forming the surface treatment layer including a B—Si-based amorphous oxide on the surface of the core as described above, the long-term lifetime properties and the thermal and chemical stability under high voltage of the positive electrode active material may be improved. Moreover, having lithium ion conductivity, the surface treatment layer may reduce the resistance at the active material surface and consequently improve the output characteristics. By preventing direct contact with the core and the electrolyte solution during battery operation, the surface treatment layer may prevent the positive electrode active material from reacting with hydrofluoric acid originating from the electrolyte solution and thereby dissolving into the electrolyte solution, and thus may improve the cycle characteristics of the battery and reduce the amount of gas which is generated. In addition, the formation of the surface treatment layer increases the tap density of the positive electrode active material, and thus, the rolling density may be increased.

Specifically, the borosilicate glass—which is a glass having boric acid rather than silicic acid as the main component—may include a borate as a network former in the oxide glass structure, and thereby exhibit excellent thermal and chemical stability. Moreover, the silicon component may reduce the moisture reactivity of the borate glass and thereby enhance the stability of the surface treatment layer itself.

The borosilicate-based glass may specifically contain $B_2O_3$ and $SiO_2$ in a 50:50 to 80:20 weight ratio.

In the borosilicate-based glass, $B_2O_3$ is the main component forming the glass composition and performs the role of forming a three-dimensional network in the glass and thereby increasing the thermal and chemical stability of the glass. However, $B_2O_3$ has moisture reactivity, and thus there is a concern that the chemical stability of the surface treatment layer may be reduced when $B_2O_3$ is included in large amounts. Thus, it is desirable to optimize the $B_2O_3$ content in the glass. Specifically, in the present disclosure, the $B_2O_3$ content may be 50 to 80 wt %, more specifically 50 to 70 wt % with respect to the total weight of the borosilicate-based glass.

Meanwhile, in the borosilicate-based glass, $SiO_2$ is a component that forms the glass network with $B_2O_3$, and in the surface treatment layer, performs the role of reducing reactivity with $H_2O$ and $B_2O_3$ generated from the electrolyte solution during battery operation. However, when the content is excessively high, another phase which is incapable of transporting lithium ions may be easily formed, and consequently, the conductivity in the surface treatment layer may be decreased. When the content is excessively low, vitrification may become difficult or the thermal expansion coefficient may become excessively high such that there is a concern of the thermal stability of the surface treatment layer being reduced. Accordingly, it is desirable to optimize the $SiO_2$ content. Specifically, in the present disclosure, the $SiO_2$ content may be 20 to 50 wt %, more specifically 30 to 50 wt % with respect to the total weight of the borosilicate-based glass.

The alkaliborosilicate-based glass further includes, in addition to $B_2O_3$ and $SiO_2$, an alkali metal oxide ($R_2O$, here, R is at least one kind of alkali metal element, such as Li, Na, or K). Here, $B_2O_3$ and $SiO_2$ are as described above.

In the alkaliborosilicate-based glass, the alkali metal oxide $R_2O$ is a component that reduces high-temperature viscosity and thereby improves meltability or formability, and when applied to the surface treatment layer, performs—as a modifier—the role of facilitating transfer from the positive electrode to the electrolyte solution. In particular, $Li_2O$ increases the conductive properties of lithium ions and during charge/discharge, may react with hydrofluoric acid originating from the electrolyte solution to prevent the positive electrode active material from dissolving into the electrolyte solution, and may thereby enhance the cycle characteristics of the battery. However, when the $R_2O$ content in the glass composition is excessively high, the thermal expansion coefficient becomes excessively high such that thermal stability is reduced, and since $R_2O$ is soluble, alkali metal elution is a concern. Accordingly, in the present disclosure, 1 to 20 parts by weight, more specifically, 5 to 15 parts by weight of $R_2O$ may be included with respect to 100 parts by weight of the sum weight of $B_2O_3$ and $SiO_2$. $R_2O$ may specifically be $Li_2O$, $Na_2O$, or $K_2O$, and the like, and any one thereof or a mixture of two or more thereof may be included. The alkaliborosilicate-based glass may include $B_2O_3$ and $SiO_2$ in a 50:50 to 80:20 weight ratio. The basis for the specified weight ratio between $B_2O_3$ and $SiO_2$ is the same as that given above in the description of the borosilicate-based glass.

The aluminoborosilicate-based glass further includes, in addition to $B_2O_3$ and $SiO_2$, $Al_2O_3$. Here, $B_2O_3$ and $SiO_2$ may be as described above.

In the aluminoborosilicate-based glass, $Al_2O_3$ is a component that increases the deformation point or Young's modulus, and may perform the role of a network former in the glass. However, when the $Al_2O_3$ content is excessively high, the thermal expansion coefficient of the glass becomes excessively low such that the high-temperature viscosity becoming excessively high is a concern. Accordingly, in the present disclosure, 0.1 to 10 parts by weight, more specifically, 0.1 to 5 parts by weight of $Al_2O_3$ may be included with respect to 100 parts by weight of the sum weight of $B_2O_3$ and $SiO_2$. The aluminoborosilicate-based glass may include $B_2O_3$ and $SiO_2$ in a 50:50 to 80:20 weight ratio. The basis for the specified weight ratio between $B_2O_3$ and $SiO_2$ is the same as that given above in the description of the borosilicate-based glass.

The borosilicate-based glass, the alkaliborosilicate-based glass, and the aluminoborosilicate-based glass may also each independently further include one or two or more of a ceramic oxide or an alkaline-earth oxide in an amount within a range that does not reduce the chemical or thermal stability of the glass.

The ceramic oxide may improve the lithium ion conductivity of the borosilicate-based glass, the alkaliborosilicate-based glass, or the aluminoborosilicate-based glass. At most 3 parts by weight, more specifically, 0.1 to 3 parts by weight of the cermic-based component may be included with respect to 100 parts by weight of the sum weight of $B_2O_3$ and $SiO_2$. The ceramic-based component may specifically be $Y_2O_3$, $ZrO_2$, or $GeO_2$, and the like.

The alkaline-earth oxide is a component that reduces high-temperature viscosity and thereby improves meltability or formability, and may specifically be BeO, MgO, CaO, or SrO, and the like. At most 3 parts by weight, more specifically, 0.1 to 3 parts by weight of the alkaline-earth oxide may be included with respect to 100 parts by weight of the sum weight of $B_2O_3$ and $SiO_2$.

The amorphous oxide or amorphous oxide glass may have a softening temperature (Ts) of 1,100 to 1,300° C. When the softening temperature is below 1,100° C., it is difficult to form the amorphous oxide glass, and when above 1,300° C., there are difficulties in the process and the occurrence of phase separation is a concern.

The lithium ion conductivity and softening temperature and the like described above may be achieved by controlling the type and content of the components forming the amorphous oxide or amorphous oxide glass.

A surface treatment layer including such amorphous oxides may be formed over the entirety of the surface of a core, or be partially formed thereon. Specifically, when the surface treatment layer is partially formed, the surface treatment layer may be formed on at least 25% and less than 100% of the total surface of the core. When the surface treatment layer is formed on less than 25% of the surface of the core, the enhancement effect resulting from the formation of the surface treatment layer may be negligible. More specifically, the surface treatment layer may be formed on 25% to 99% of the surface.

Meanwhile, when the surface treatment layer is partially formed, a plurality of locally formed surface treatment layers may be present on the surface of the core.

It is desirable to form the surface treatment layer to an appropriate thickness taking into account the core particle size, which determines the positive electrode active material capacity. Specifically, the surface treatment layer may be formed to an average thickness ratio of 0.01 to 0.1 with respect to the radius of the core. When the thickness ratio of the surface treatment layer is less than 0.01, the enhancement effect resulting from the formation of the surface treatment layer may be negligible, and when the thickness ratio of the surface treatment layer is greater than 0.1, there is a concern that the resistance to lithium ions passing through the surface treatment layer may be increased.

In the present disclosure, the particle diameter of the core and the thickness of the surface treatment layer may be measured through cross-sectional analysis of the particle using a forced ion beam (fib).

Meanwhile, in the positive electrode active material, the core is a compound capable of reversible lithium intercalation and deintercalation (a lithiated intercalation compound), and may specifically include a lithium nickel manganese cobalt oxide including lithium, nickel, manganese, and cobalt.

More specifically, the lithium nickel manganese cobalt oxide may be, for example, $Li(Ni_{P1}Mn_{Q1}Co_{R1})O_2$ (where $0<P1<1$, $0<Q1<1$, $0<R1<1$, $P1+Q1+R1=1$) or $Li(Ni_{P2}Mn_{Q2}Co_{R2})O_4$ (where $0<P2<2$, $0<Q2<2$, $0<R2<2$, $P2+Q2+R2=2$).

Specific examples of the lithium nickel manganese cobalt oxide may be $Li(Ni_{0.6}Mn_{0.2}Co_{0.2})O_2$, $LiNi_{0.5}Mn_{0.3}Co_{0.2}O_2$, $LiNi_{0.7}Mn_{0.15}Co_{0.15}O_2$, or $LiNi_{0.8}Mn_{0.1}Co_{0.1}O_2$ and the like.

In the lithium nickel manganese cobalt oxide, at least one of the non-lithium elements may also be doped with one or two or more elements selected from the group consisting of W, Mo, Zr, Ti, Mg, Ta, Al, Fe, V, Cr, Ba, Ca, and Nb. When a lithium-defected lithium nickel manganese cobalt oxide is further doped with the metal element as described above, the structural stability of the positive electrode active material is improved, and the output characteristics of the battery may be improved as a result. Here, the dopant element content in the lithium nickel manganese cobalt oxide may be appropriately controlled within a range in which the properties of the positive electrode active material are not degraded. The range may specifically be 0 to 0.02 at %.

More specifically, in the positive electrode active material according to an embodiment of the present disclosure, the lithium nickel manganese cobalt oxide may include the compound represented by Formula 1.

   [Formula 1]

(In Formula 1, M1 includes one or two or more elements selected from the group consisting of W, Mo, Zr, Ti, Mg, Ta, Al, Fe, V, Cr, Ba, Ca, and Nb, and the conditions $0.8 \le a \le 1.5$, $0<x \le 0.5$, $0<y \le 0.5$, $0<z \le 0.02$, and $0<x+y \le 0.7$, and more specifically, $0.8 \le a \le 1.2$, $0<x \le 0.5$, $0<y \le 0.5$, $0.0005 \le z \le 0.02$, $0<x+y \le 0.7$, may be satisfied).

By applying the positive electrode active material including the lithium nickel manganese cobalt oxide described above to a lithium secondary battery, high capacity properties may be achieved even under high voltages of at least 4.3 V, for example, 4.5 V. However, when a positive electrode active material including a lithium manganese oxide is applied to a lithium secondary battery, although the cycle characteristics are good, the energy density is low, and thus the positive electrode active material may be unsuitable for lithium secondary batteries that require high voltage and high thermal capacity. Moreover, during high-temperature operation, manganese may be eluted to disadvantageously cause a sharp decrease in capacity.

The core including the lithium nickel manganese cobalt oxide may be a primary particle, and may also be in the form of a secondary particle composed of agglomerated primary particles. Here, the primary particles may be uniform, and may also be non-uniform.

The core may have an average particle diameter ($D_{50}$) of 1 to 20 μm taking into consideration the specific surface area of the positive electrode active material and the density of a positive electrode mixture. When the average particle diameter is less than 1 μm, reduced dispersibility in the positive electrode mixture is a concern due to the cohesion of the positive electrode active material. When the average particle diameter is greater than 20 μm, reduced mechanical intensity of the positive electrode active material and decreased specific surface area are concerns. Taking into consideration the significance of the enhancement effect—on the rate capability and initial capacity properties of the battery—resulting from control of the particle size of the core, the average particle diameter ($D_{50}$) may be 3 to 18 μm. When the core is a secondary particle, the average particle diameter ($D_{50}$) of the primary particles forming the secondary particle may be 50 nm to 1,000 nm.

In the present disclosure, the average particle diameter ($D_{50}$) of the positive electrode active material may be defined as the particle diameter at 50% in the particle diameter distribution. In the present disclosure, the average particle diameter ($D_{50}$) of the positive electrode active material may be measured using, for example, a laser diffraction method. Specifically, the average particle diameter ($D_{50}$) of the positive electrode active material may be the particle diameter at 50% in a particle diameter distribution obtained by dispersing the positive electrode active material particles in a dispersion medium and then using a commercial laser diffraction particle size analyzer (for example, the Microtrac MT 3000) to emit approximately 28 kHz ultrasonic waves at an output power of 60 W.

The positive electrode active material according to an embodiment of the present disclosure having the structure and composition described above may have an average particle diameter ($D_{50}$) of 1 to 20 μm, and a BET specific surface area of 0.1 to 1.9 m$^2$/g.

When the positive electrode active material has an average particle diameter ($D_{50}$) of less than 1 μm or a BET specific surface area exceeding 1.9 m$^2$/g, reduced dispersibility of the positive electrode active material in the active material layer due to the cohesion of the positive electrode active material and increased resistance in the electrode are concerns, and when the positive electrode active material has an average particle diameter ($D_{50}$) greater than 20 μm or a BET specific surface area below 0.1 m$^2$/g, reduced dispersibility of the positive electrode active material itself and reduced capacity are concerns. Moreover, the positive electrode active material according to an embodiment of the present disclosure may exhibit excellent capacity and charge/discharge characteristics by satisfying the above conditions for both average particle diameter and BET specific surface area. More specifically, the positive electrode active material may have an average particle diameter ($D_{50}$) of 3 to 18 μm and a BET specific surface area of 0.2 to 0.5 m$^2$/g.

In the present disclosure, the average particle diameter ($D_{50}$) of the positive electrode active material may be defined and measured in the same way as when measuring the average particle diameter of the core. Moreover, in the present disclosure, the specific surface area is measured using the BET (Brunauer-Emmett-Teller) method, and specifically, by using the BEL Japan BELSORP-mino II, may be derived from the amount of nitrogen gas adsorption at the liquid nitrogen temperature (77 K).

The positive electrode active material according to an embodiment of the present disclosure may have a tap density of at least 1.5 g/cc, or 1.5 to 3 g/cc. By having a high tap density in this range, the positive electrode active material may exhibit high-capacity properties. In the present disclosure, the tap density of the positive electrode active material may be measured using a typical tap density analyzer, and specifically, may be measured using a LOGAN TAP-2S. More specifically, the positive electrode active material may have a tap density of 2.0 to 2.5 g/cc.

The positive electrode active material according to an embodiment of the present disclosure may exhibit a lithium ion conductivity of at least $10^{-7}$ S/cm, specifically $10^{-4}$ S/cm. Specifically, when pressed density of the positive electrode active material (pressure: 2,000 kgf/cm$^2$) is 2 to 4 g/cc, a lithium ion conductivity of $10^{-2}$ to $10^{-4}$ S/cm may be exhibited.

A positive electrode active material according to an embodiment of the present disclosure may be prepared using a preparation method including a first operation for using a boron-containing raw material and a silicon-containing raw material to form a boron and silicon-containing amorphous oxide; and a second operation for mixing the amorphous oxide with a lithium nickel manganese cobalt oxide and then heat treating to form a surface treatment layer including the amorphous oxide on a core including the lithium nickel manganese cobalt oxide. Therefore, according to another embodiment of the present disclosure, a method for preparing the positive electrode active material is provided.

Specifically, the first operation may be an operation for forming the amorphous oxide by heat treating and thereby melting the boron-containing raw material and the silicon-containing raw material at 1,000° C. or higher, specifically 1,000 to 1,800° C., more specifically 1,000 to 1,300° C., and then cooling.

Specifically, the boron-containing raw material may be boron trioxide or a borate-based compound or glass, and the like. The borate-based glass may be a $B_2O_3$ glass capable of forming a three-dimensional network with a boroxol group.

The silicon-containing raw material may be silicon (Si), silica ($SiO_2$), or a silicate-based compound, and one or a mixture of two or more thereof may be used. The silicate-based compound may be an alkali metal silicate.

The mixing ratio of the boron-containing raw material and the silicon-containing raw material may be appropriately determined in consideration of the content in an amorphous oxide forming the surface treatment layer. Specifically, the boron-containing raw material and the silicon-containing raw material may be mixed in a 50:50 to 80:20 weight ratio. The reason for specifying the range of the weight ratio is as described above with respect to the borosilicate-based glass.

When the amorphous oxide forming the surface treatment layer further includes a metal-based or ceramic-based oxide component such as an alkali metal oxide, an aluminum oxide, or a ceramic-based oxide, a raw material including such metal or ceramic elements may be selectively further added along with the boron-containing raw material and the silicon-containing raw material. Here, the alkali metal oxide, the aluminum oxide, or the ceramic-based oxide that can be included in the amorphous oxide is as described above.

Meanwhile, a small, nanoscale particle size is desirable for ensuring that the amorphous oxide is well coated on the core. The average particle diameter of the amorphous oxide may be 100 to 1,000 nm, specifically 100 to 500 nm. When the average particle diameter of the boron and silicon-containing amorphous oxide is less than 100 nm, the coatability on the surface of the positive electrode active material may be reduced due to agglomeration among the raw material particles, and when the average particle diameter is greater than 1,000 nm, there is a concern that the raw material may not be sufficiently melted or the surface treatment layer may be less densely formed.

Accordingly, a milling operation may be selectively further performed on the boron and silicon-containing amorphous oxide to enable to have the above particle size. Here, the milling operation may be performed using a typical milling operation such as ball milling.

Next, a surface treatment layer including the amorphous oxide is formed on the core including a lithium nickel manganese cobalt oxide (second operation). More specifically, the second operation may be performed by mixing the amorphous oxide formed in the first operation with the lithium nickel manganese cobalt oxide for forming the core, and the heat treating.

Here, the mixing is desirably a solid-phase mixing. When a solid-phase mixing method is used, the formation of side reaction products due to solvents used in liquid-phase mixing is not a concern, and the formation of a more uniform surface treatment layer is possible.

The heat treating operation may be performed at a temperature of 300 to 600° C. If the heat treatment temperature is below 300° C., there is a concern that the formability of the surface treatment layer may be reduced, and if the heat treatment temperature is above 600° C., deformation of the positive electrode active material may occur, and the generation of side products resulting from over-sintering is a concern. More specifically, the heat treating operation may be performed at a temperature of 300 to 500° C.

The heat treating operation may be performed in multiple stages in the above temperature range, and here, the temperature may be variously modified according to each stage.

The atmosphere in which the heat treatment is performed is not particularly limited, and the heat treatment may be performed in a vacuum, an inert atmosphere, or a normal atmosphere. In addition, the heat treating operation may be performed under such conditions for 5 to 48 hours, or 10 to 20 hours.

The positive electrode active material in which a boron (B) and silicon (Si)-containing amorphous oxide—more specifically a surface treatment layer including an amorphous oxide glass—is formed on the surface of a core including a lithium nickel manganese cobalt oxide may be prepared through a method such as above.

According to another embodiment of the present disclosure, a positive electrode including the positive electrode active material and a lithium secondary battery are provided.

Specifically, the positive electrode includes a positive electrode current collector and a positive electrode active material layer which is formed on the positive electrode current collector and includes the positive electrode active material.

The positive electrode current collector which is conductive and does not cause chemical changes to the battery is not particularly limited, and stainless steel, aluminum, nickel, titanium, baked carbon, or an aluminum or stainless steel surface treated with carbon, nickel, titanium, or silver and the like may be used. The thickness of the positive electrode current collector may typically be 3 to 500 µm, and fine hills and valleys may be formed on the surface of the current collector and increase the adhesiveness of the positive electrode active material. The positive electrode current collector may be used in a variety of forms, for example, a film, a sheet, a foil, a net, a porous body, a foamed body, or a non-woven fabric body and the like.

Along with the positive electrode active material described above, the positive electrode active material layer may include a conductive material and a binder.

Here, a conductive material which is used for imparting conductivity to the electrode and does not cause chemical changes to the battery may be used without particular limit as the conductive material. Specific examples may include a graphite such as natural graphite or synthetic graphite; carbon-based materials such as carbon black, acetylene black, Ketjen black, channel black, furnace black, lamp black, thermal black, or carbon fiber; a metal powder or metal fiber such as copper, nickel, aluminum, or silver; a conductive whisker such as zinc oxide or potassium titanate; a conductive metal oxide such as titanium oxide; or a conductive polymer such as a polyphenylene derivative. One or a mixture of two or more thereof may be used. Typically, 1 to 30 wt % of the conductive material may be included with respect to the total weight of the positive electrode active material layer.

The binder may have the role of improving the adhesion among the positive electrode active material particles and the adhesiveness between the positive electrode active material and the current collector. Specific examples may include polyvinylidene fluoride (PVDF), vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluorocarbon rubber, or various copolymers thereof, and one or a mixture of two or more thereof may be used. 1 to 30 wt % of the binder may be included with respect to the total weight of the positive electrode active material layer.

Other than using the positive electrode active material described above, the positive electrode may be manufactured according to a typical positive electrode manufacturing method. Specifically, after applying onto a positive electrode current collector, a composition for forming a positive electrode active material including the positive electrode active material and, selectively, a binder and a conductive material, the composition may be dried and rolled to manufacture the positive electrode. Here, the type and content of each of the positive electrode active material, the binder, and the conductive material is as described above.

A typical solvent used in the field may be used as the solvent, for example, dimethyl sulfoxide (DMSO), isopropyl alcohol, n-methylpyrrolidone (NMP), acetone, or water, and one or a mixture of two or more thereof may be used. The amount of the solvent is sufficient when capable of dissolving or dispersing the positive electrode active material, the conductive material, and the binder in consideration of the thickness of the applied slurry and the manufacturing yield, and resulting in a viscosity that enables the slurry to have excellent thickness uniformity when subsequently applied in order to manufacture the positive electrode.

In another method, the electrode may also be manufactured by casting a composition for forming the positive electrode active material on a separate support and then laminating on the positive electrode current collector, a film obtained by being exfoliated from the support.

According to another embodiment of the present disclosure, an electrochemical device including the positive electrode is provided. The electrochemical device may specifically be a battery or a capacitor and the like, and more specifically, may be a lithium secondary battery.

The lithium secondary battery specifically includes a positive electrode, a negative electrode positioned facing the positive electrode, a separator disposed between the positive electrode and the negative electrode, and an electrolyte, the positive electrode being the same as described above. The lithium secondary battery may selectively further include a battery case housing an electrode assembly composed of the positive electrode, the negative electrode, and the separator, and a sealing member which seals the battery case.

In the lithium secondary battery, the negative electrode includes a negative electrode current collector and a negative electrode active material layer positioned on the negative electrode current collector.

The negative electrode current collector which is highly conductive and does not cause chemical changes to the battery is not particularly limited. For example, copper, stainless steel, aluminum, nickel, titanium, baked carbon, or a copper or stainless steel surface treated with carbon, nickel, titanium, silver, etc., or an aluminum-cadmium alloy and the like may be used. The negative electrode current collector may typically have a thickness of 3 to 500 µm, and as in the positive current collector, fine hills and valleys may be formed on the surface of the current collector and increase the adhesiveness of a negative electrode active material. The negative electrode current collector may be used in a variety of forms, for example, a film, a sheet, a foil, a net, a porous body, a foamed body, or a non-woven fabric body and the like.

Along with the negative electrode active material, the negative electrode active material layer may selectively include a binder and a conductive material. The negative electrode active material layer may be prepared, for example, by applying and drying on the negative electrode current collector, a composition for forming a negative electrode which includes the negative electrode active material and, selectively, the binder and conductive material, or by casting the composition for forming the negative electrode on a separate support and laminating on the negative electrode current collector, a film obtained by being exfoliated from the support.

A compound capable of reversible lithium intercalation and deintercalation may be used as the negative electrode active material. Specific examples may include a carbonaceous material such as synthetic graphite, natural graphite, graphitized carbon fiber, or amorphous carbon; a metallic compound that can be alloyed with lithium, such as Si, Al, Sn, Pb, Zn, Bi, In, Mg, Ga, Cd, a Si alloy, a Sn alloy, or an Al alloy; a metal oxide that can dope and dedope lithium, such as $SiO_x$ (0<x<2), $SnO_2$, vanadium oxide, or lithium vanadium oxide; or a composite that includes the metallic compound and the carbonaceous material, such as a Si—C composite or a Sn—C composite, and one or a mixture of two or more thereof may be used. Moreover, a metal lithium thin film may be used as the negative electrode active material. Both low-crystallinity carbon and high-crystallinity carbon may be used as the carbon material. Soft carbon and high carbon are representative low-crystallinity carbons, while amorphous, planar, flake, spherical, or fiber-shaped natural or synthetic graphite, and high-temperature baked carbons such as Kish graphite, pyrolytic carbon, mesophase pitch based carbon fiber, meso-carbon microbeads, mesophase pitches, and petroleum or coal tar pitch derived cokes are representative high-crystallinity carbons.

The binder and the conductive material may be the same as described for the positive electrode.

Meanwhile, in the lithium secondary battery, the separator separates the negative electrode from the positive electrode and provides a movement path for lithium ions, and a separator typically used in lithium secondary batteries may be used without particular limit. In particular, it is desirable for the separator to have low resistance to ionic movement in the electrolyte and excellent electrolyte solution-absorbing ability. Specifically, a porous polymer film, for example, a porous polymer film prepared using a polyolefin-based polymer such as an ethylene homopolymer, a propylene homopolymer, an ethylene/butene copolymer, an ethylene/hexene copolymer, or an ethylene/methacrylate copolymer, or a laminated structure of two or more layers thereof may be used. A typical porous non-woven fabric, for example, a non-woven fabric composed of a high-melting point glass fiber or polyethylene terephthalate fiber may also be used. A coated separator including a ceramic component or polymer material for heat resistance or mechanical strength may be used, and may be selectively used as a single- or multi-layered structure.

The electrolyte used in the present disclosure may be an organic liquid electrolyte, an inorganic liquid electrolyte, a solid polymer electrolyte, a gel-type polymer electrolyte, a solid inorganic electrolyte, or a melting-type inorganic electrolyte and the like, but is not limited thereto.

Specifically, the electrolyte may include an organic solvent and a lithium salt.

An organic solvent which is capable of having the role of a medium—in which ions involved in the electrochemical reactions of a battery can move—may be used without particular limit. Specifically, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone, an aromatic hydrocarbon-based solvent such as benzene or fluorobenzene; a carbonate-based solvent such as dimethylcarbonate (DMC), diethylcarbonate (DEC), methylethylcarbonate (MEC), ethylmethylcarbonate (EMC), ethylene carbonate (EC), or propylene carbonate (PC); an alcohol-based solvent such as ethyl alcohol or isopropyl alcohol; a nitrile such as R—CN (where R is a C2 to C20 linear, branched, or cyclic hydrocarbon group, and may include a double-bonded aromatic ring or an ether bond); an amide such as dimethylformamide; a dioxolane such as such as 1,3-dioxolane; or a sulfolane may be used. Among these, the carbonate-based solvent is desirable, and a mixture of a high-ionic conductivity, high-permittivity cyclic carbonate (for example, ethylene carbonate, propylene carbonate) which can increase the charge/discharge performance of the battery, and a low-viscosity linear carbonate-based compound (for example, ethyl methyl carbonate, dimethyl carbonate, or diethyl carbonate) is more desirable. In this case, excellent electrolyte solution performance may be exhibited by using the cyclic carbonate and the linear carbonate mixed in a volume ratio of about 1:1 to about 1:9.

A lithium salt which can provide lithium ions used in the lithium secondary battery may be used as the lithium salt without particular limit. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ and the like may be used as the lithium salt. It is desirable for the lithium salt concentration to be in the range of about 0.1 to 2.0 M. Since the electrolyte has a desirable conductivity and viscosity when the lithium salt concentration is within this range, excellent electrolyte performance may be exhibited, and the lithium ions may move effectively.

In the electrolyte, in addition to the above components forming the electrolyte, at least one type of additive may be further included in order to improve battery lifetime, inhibit battery capacity reduction, or improve battery discharge capacity, etc., for example, a haloalkylene carbonate-based compound such as difluoroethylene carbonate, pyridine, triethyl phosphate, triethanolamine, cyclic ether, ethylene diamine, n-glyme, hexaphosphoric triamide, a nitrobenzene derivative, sulfur, a quinone imine dye, n-substituted oxazolidinone, n,n-substituted imidazolidine, ethylene glycol dialkyl ether, ammonium salt, pyrrole, 2-methoxy ethanol, or aluminum trichloride. Here, the additive content may be 0.1 to 5 wt % with respect to the total weight of the electrolyte.

As above, a lithium secondary battery including a positive electrode active material according to the present disclosure reliably exhibits an excellent discharge capacity, excellent output characteristics, and an excellent capacity maintenance ratio, and thus is useful in the fields of mobile devices such as mobile phones, notebook computers, digital cameras, etc., and electric vehicles, such as hybrid electric vehicles (HEV).

In particular, the lithium secondary battery according to the present disclosure may be advantageously used as a battery for high voltages of at least 4.3 V, for example 4.5 V.

According to another embodiment of the present disclosure, a battery module including the lithium secondary battery as a unit cell, and a battery pack including the same are provided.

The battery module or battery pack may be used as a power source for one or more mid- to large-scale devices among power tools; electric cars such as electric vehicles (EV), hybrid electric vehicles, and plug-in hybrid electric vehicles (PHEV); and electrical power storage systems.

Hereinafter, examples of the present disclosure are described in detail to enable a person with ordinary knowledge in the art to easily carry out the present disclosure. However, the present disclosure may be realized in various different forms and is not limited to the examples described herein.

Example 1-1: Preparation of Positive Electrode Active Material

After mixing $B_2O_3$ and $SiO_2$ in a 70:30 weight ratio ($B_2O_3$:$SiO_2$) and then heat treating and thereby melting at 1,200° C., a borosilicate-based glass was prepared by cooling at room temperature. Then, the borosilicate-based glass was milled to an average particle size ($D_{50}$) of 300 nm.

Next, after solid-phase mixing in a reactor, 0.3 parts by weight of the borosilicate-based glass with 100 parts by weight of a core particle ($D_{50}$=13 μm) including $LiNi_{0.6}Co_{0.2}Mn_{0.2}O_2$, the mixture was heated at 300° C. to prepare a positive electrode active material (BET specific surface area=0.2 $m^2$/g, tap density=2.5 g/cc) in which a surface treatment layer (average thickness=0.1 μm) of a B and Si-containing amorphous oxide is formed on the surface of the core particle including $LiNi_{0.6}Co_{0.2}Mn_{0.2}O_2$.

Example 1-2: Preparation of Positive Electrode Active Material

After mixing $B_2O_3$ and $SiO_2$ in a 50:50 weight ratio ($B_2O_3$:$SiO_2$) and then heat treating and thereby melting at 1,100° C., a borosilicate-based glass was prepared by cooling at room temperature. Then, the borosilicate-based glass was milled to an average particle size ($D_{50}$) of 300 nm.

Next, after solid-phase mixing in a reactor, 0.5 parts by weight of the borosilicate-based glass with 100 parts by weight of a core particle ($D_{50}$=13 μm) including $LiNi_{0.6}Co_{0.2}Mn_{0.2}O_2$, the mixture was heated at 500° C. to prepare a positive electrode active material (BET specific surface area=0.25 $m^2$/g, tap density=2.4 g/cc) in which a surface treatment layer (average thickness=0.8 μm) of a B and Si-containing amorphous oxide is formed on the surface of the core particle including $LiNi_{0.6}Co_{0.2}Mn_{0.2}O_2$.

Example 1-3: Preparation of Positive Electrode Active Material

After mixing $B_2O_3$, $SiO_2$, and $Li_2O$ in a 50:50:10 weight ratio ($B_2O_3$:$SiO_2$:$Li_2O$) and then heat treating and thereby melting at 1,200° C., an alkaliborosilicate-based glass was prepared by cooling at room temperature. Then, the alkaliborosilicate-based glass was milled to an average particle size ($D_{50}$) of 200 nm.

Next, after solid-phase mixing in a reactor, 0.5 parts by weight of the alkaliborosilicate-based glass with 100 parts by weight of a core particle ($D_{50}$=13 μm) including $LiNi_{0.6}Co_{0.2}Mn_{0.2}O_2$, the mixture was heated at 500 degrees Celsius to prepare a positive electrode active material (BET specific surface area=0.25 $m^2$/g, tap density=2.43 g/cc) in which a surface treatment layer (average thickness=1.2 μm) of a B, Si, and Li-containing amorphous oxide is formed on the surface of the core particle including $LiNi_{0.6}Co_{0.2}Mn_{0.2}O_2$.

Example 1-4: Preparation of Positive Electrode Active Material

After mixing $B_2O_3$, $SiO_2$, and $Al_2O_3$ in a 50:50:5 weight ratio ($B_2O_3$:$SiO_2$:$Al_2O_3$) and then heat treating and thereby melting at 1,200° C., an aluminoborosilicate-based glass was prepared by cooling at room temperature. Then, the aluminoborosilicate-based glass was milled to an average particle size ($D_{50}$) of 200 nm.

Next, after solid-phase mixing in a reactor, 0.5 parts by weight of the aluminoborosilicate-based glass with 100 parts by weight of a core particle ($D_{50}$=14 μm) including $LiNi_{0.6}Co_{0.2}Mn_{0.2}O_2$, the mixture was heated at 500° C. to prepare a positive electrode active material (BET specific surface area=0.23 $m^2$/g, tap density=2.38 g/cc) in which a surface treatment layer (average thickness=1.2 μm) of a B, Si, and Al-containing amorphous oxide is formed on the surface of the core particle including $LiNi_{0.6}Co_{0.2}Mn_{0.2}O_2$.

Example 1-5: Preparation of Positive Electrode Active Material

Other than using a core particle ($D_{50}$=13 μm) that includes $LiNi_{0.6}Co_{0.18}Mn_{0.2}W_{0.02}O_2$ rather than $LiNi_{0.6}Co_{0.2}Mn_{0.2}O_2$ as in Example 1-1, the same method as in Example 1-1 was used to prepare a positive electrode active material (BET specific surface area=0.2 $m^2$/g, tap density=2.44 g/cc) in which a surface treatment layer (average thickness=1.2 μm) of a B and Si-containing amorphous oxide is formed on the surface of a core particle including $LiNi_{0.6}Co_{0.18}Mn_{0.2}W_{0.02}O_2$.

Comparative Example 1-1: Preparation of Positive Electrode Active Material

Other than using 0.5 parts by weight of a $B_2O_3$ glass particle ($D_{50}$=300 nm) with respect to 100 parts by weight of a core particle ($D_{50}$=13 μm) including $LiNi_{0.6}Co_{0.2}Mn_{0.2}O_2$, the same method as in Example 1-1 was used to prepare a positive electrode active material (average thickness=0.8 μm) in which a B-containing crystalline oxide layer is formed on the surface.

Comparative Example 1-2: Preparation of Positive Electrode Active Material

Other than using 0.5 parts by weight of a $SiO_2$ glass particle ($D_{50}$=300 nm) with respect to 100 parts by weight of a core particle ($D_{50}$=13 μm) including $LiNi_{0.6}Co_{0.2}Mn_{0.2}O_2$, the same method as in Example 1-1 was used to prepare a positive electrode active material (average thickness=0.8 μm) in which a Si-containing crystalline oxide layer is formed on the surface.

Comparative Example 1-3: Preparation of Positive Electrode Active Material

After mixing $B_2O_3$, $SiO_2$, and $Li_2O$ in a 40:40:20 weight ratio ($B_2O_3$:$SiO_2$:$Li_2O$) and then heat treating and thereby melting at 1,000° C., an alkaliborosilicate-based glass was prepared by cooling at room temperature. Then, the alkaliborosilicate-based glass was milled to an average particle size ($D_{50}$) of 200 nm Next, after solid-phase mixing in a reactor, 0.5 parts by weight of the alkaliborosilicate-based glass with 100 parts by weight of a core particle ($D_{50}$=12 μm) including $LiMn_2O_4$, the mixture was heated at 500° C. to prepare a positive electrode active material (BET specific surface area=0.43 $m^2$/g, tap density=1.8 g/cc) in which a surface treatment layer (average thickness=0.8 μm) of a B, Si, and Li-containing amorphous oxide is formed on the surface of the core particle including $LiMn_2O_4$.

Experimental Example 1-1: Evaluation of Positive Electrode Active Material Properties (1)

ICP was used to observe the surface treatment layer-forming materials Si and B in the positive electrode active materials in Example 1-1, Example 1-2, Comparative Example 1-1, and Comparative Example 1-2, and the results are displayed in Table 1.

TABLE 1

|  | Si (mg/kg) | B (mg/kg) |
| --- | --- | --- |
| Example 1-1 | 125 | 600 |
| Example 1-2 | 165 | 650 |
| Comparative Example 1-1 | <1.0 | 705 |
| Comparative Example 1-2 | 1360 | <1.0 |

Experimental Example 1-2: Evaluation of Positive Electrode Active Material Properties (2)

The positive electrode active material in Example 1-1 was recorded using transmission electron microscopy (TEM) and displayed in FIG. 1. Energy dispersive x-ray spectroscopy (EDX) results obtained from the surface treatment layer (spectrum 1) in Example 1-1 are displayed in FIG. 2. Energy dispersive x-ray spectroscopy (EDX) results obtained from the core part (spectrum 2) in Example 1-1 are displayed in FIG. 3.

Figure 2:
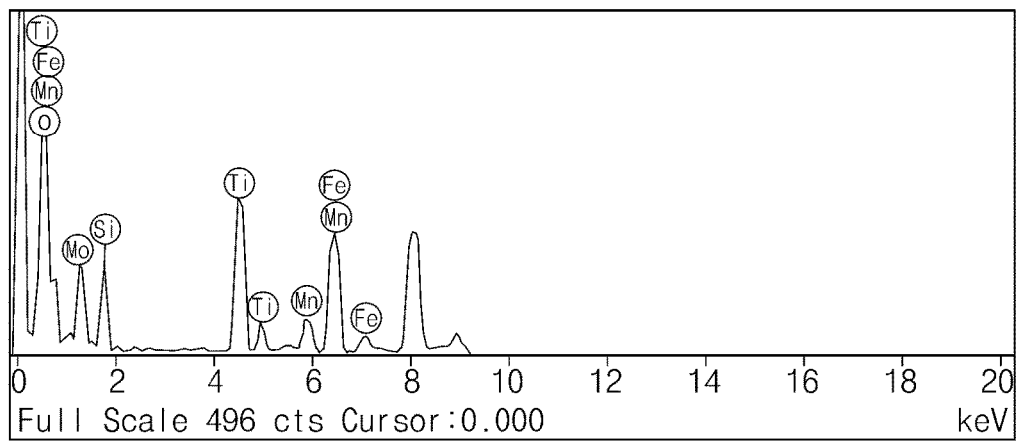
FIG. 2 displays energy dispersive x-ray spectroscopy (EDX) results obtained from spectrum 1 (surface treatment layer) in FIG. 1.
Figure 3:
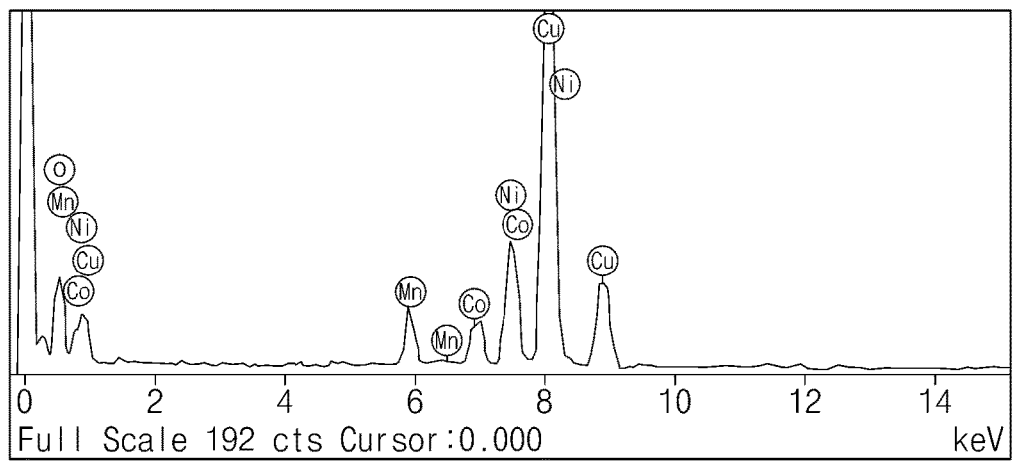
FIG. 3 displays energy dispersive x-ray spectroscopy (EDX) results obtained from spectrum 2 (core part) in FIG. 1.

Referring to FIGS. 1 to 3, B and Si were detected in the surface treatment layer of the positive electrode active material in Example 1-1 and Ni, Mn, Co, etc. were detected in the core part of the positive electrode active material in Example 1-1. Thus, it could be confirmed that a surface treatment layer including B and Si was formed in the positive electrode active material in Example 1-1.

Experimental Example 1-3: Evaluation of Positive Electrode Active Material Properties (3)

X-ray diffraction analysis of the surface treatment layer in the positive electrode active material in Example 1-1 was performed to determine whether the material forming the surface treatment layer was crystalline. The results thereof are displayed in FIG. 4.

Figure 4:
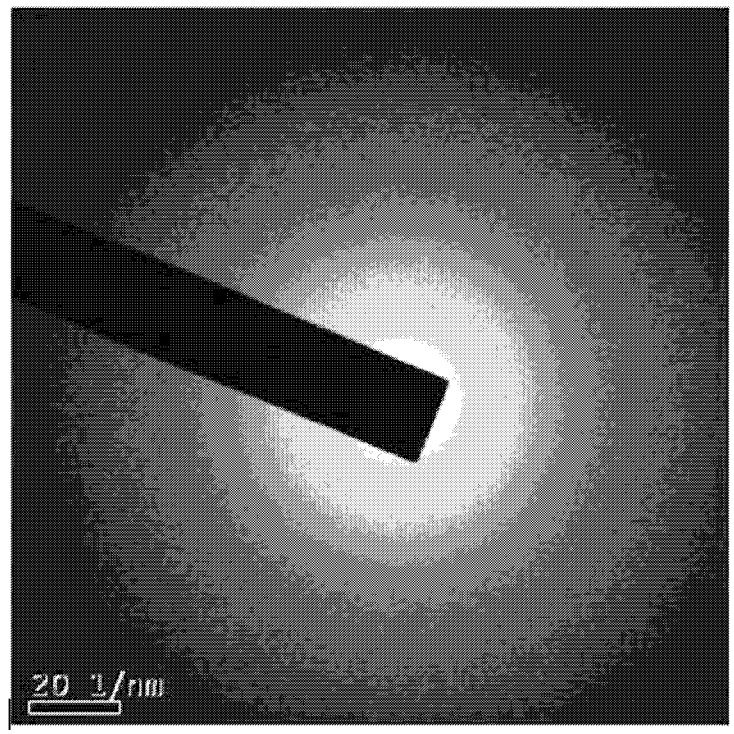
FIG. 4 displays x-ray diffraction (XRD) results obtained from a surface treatment layer in Example 1-1.

Referring to FIG. 4, it can be confirmed that the material forming the surface treatment layer in the positive electrode active material in Example 1-1 is an amorphous compound.

Examples 2-1 to 2-2 and Comparative Examples 2-1 to 2-3: Preparation of Positive Electrode A mixture of a positive electrode active material, carbon black as a conductive material, and PVDF as a binder—which are listed in Table 2 below—mixed in a mixture ratio by weight of 95:2.5:2.5 was mixed with a solvent, n-methylpyrrolidone, to prepare a composition (viscosity: 5000 mPa·s) for forming a positive electrode, and after being applied onto the aluminum current collector and then dried at 130° C., the composition was rolled to manufacture the positive electrode.

TABLE 2

|  | Positive electrode | | | |
| --- | --- | --- | --- | --- |
|  | Positive electrode active material | Conductive material | Binder | Solvent |
| Example 2-1 | Example 1-1 | Carbon black | PVdF | n-methyl-pyrrolidone |
| Example 2-2 | Example 1-2 | Carbon black | PVdF | n-methyl-pyrrolidone |
| Comparative Example 2-1 | Comparative Example 1-1 | Carbon black | PVdF | n-methyl-pyrrolidone |
| Comparative Example 2-2 | Comparative Example 1-2 | Carbon black | PVdF | n-methyl-pyrrolidone |
| Comparative Example 2-3 | Comparative Example 1-3 | Carbon black | PVdF | n-methyl-pyrrolidone |

Example 3-1, Example 3-2, Comparative Example 3-1, and Comparative Example 3-2: Manufacture of Coin Half Cell A positive electrode and a negative electrode listed in Table 3 below were formed by being cut into 1.4875 cm² cylinders. A coin half cell was manufactured by placing a separating film between the positive electrode and the negative electrode, dissolving 0.5 wt % of vinylene carbonate in a mixed solution in which the mixing ratio by volume of methylethylcarbonate (EMC) to ethylene carbonate (EC) is 7:3, and injecting into the mixed solution, a 1 M electrolyte solution of $LiPF_6$.

TABLE 3

|  | Positive electrode | Negative electrode | Separating film |
| --- | --- | --- | --- |
| Example 3-1 | Example 2-1 | Li thin film | Porous polyethylene |
| Example 3-2 | Example 2-2 | Li thin film | Porous polyethylene |
| Comparative Example 3-1 | Comparative Example 2-1 | Li thin film | Porous polyethylene |
| Comparative Example 3-2 | Comparative Example 2-2 | Li thin film | Porous polyethylene |

Experimental Example 3-1: Evaluation of Coin Half Cell Properties (1)

The coin half cell in Example 3-1, Example 3-2, Comparative Example 3-1, and Comparative Example 3-2 were charged at 25° C. until reaching 4.25 V at a constant current (CC) of 0.1 C, and afterwards, a first charging was performed by charging at a constant voltage (CV) of 4.25 V until reaching a charging current of 0.05%. After being isolated for 20 minutes, the batteries were discharged at a constant current of 0.1 C until reaching 3.0 V, and the first cycle discharge capacity was measured. Later, the charge/discharge capacity, charge/discharge efficiency, and rate capability were each measured after changing the discharge condition to 2 C. The results are displayed in Table 4.

TABLE 4

| | First charge/discharge | | | 2 C rate | |
|---|---|---|---|---|---|
| | Charge capacity (mAh/g) | Discharge capacity (mAh/g) | Charge/ discharge efficiency (%) | Capacity (mAh/g) | 2.0 C/ 0.1 C (%) |
| Example 3-1 | 193.0 | 172.6 | 89.4 | 151.3 | 87.8 |
| Example 3-2 | 191.6 | 169.5 | 88.5 | 148.9 | 87.9 |
| Comparative Example 3-1 | 191.4 | 168.9 | 88.2 | 147.1 | 87.2 |
| Comparative Example 3-2 | 187.9 | 165.0 | 87.8 | 144.2 | 87.2 |

Referring to Table 4, the coin half cells in Examples 3-1 and 3-2 exhibited higher charge/discharge capacities and charge/discharge efficiencies, as well as better rate capabilities than the coin half cells in Comparative Examples 3-1 and 3-2.

Experimental Example 3-2: Evaluation of Coin Half Cell (2)

Figure 5:
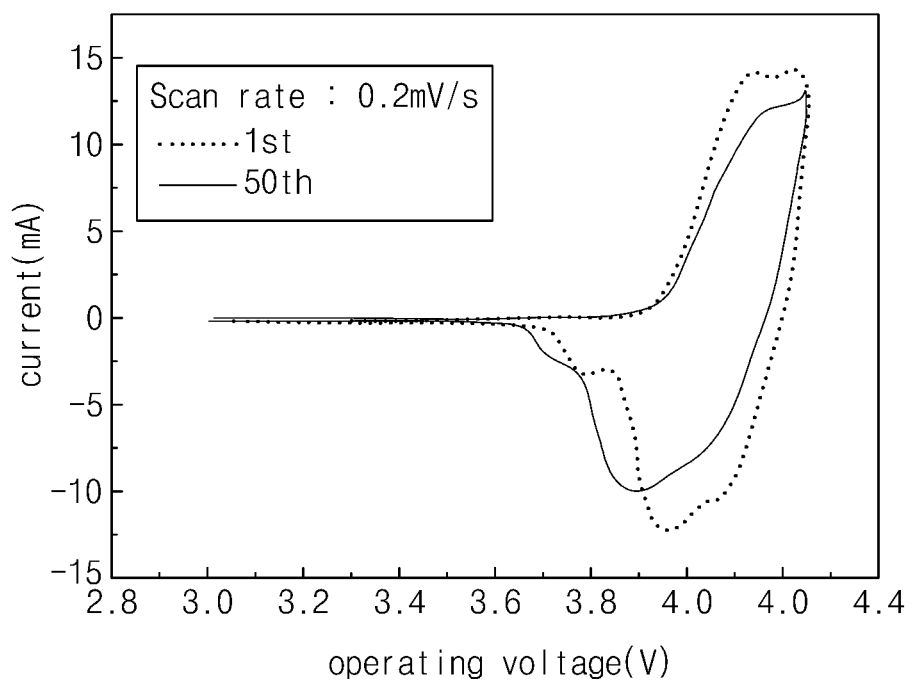
FIG. 5 is a graph showing the current-voltage relationship when charging/discharging a coin half cell in Comparative Example 3-3.

After charging/discharging the coin half cell in Comparative Example 3-3 for 50 cycles at 0.5 C/0.5 C conditions at 25° C. under an operating voltage in the range of 3 to 4.25 V, the charge/discharge capacity of the first cycle and the charge/discharge capacity of the 50th cycle were measured. The measurement results are displayed in FIG. 5. As shown in FIG. 5, it may be seen that when $LiMn_2O_4$ is used for the core, a change occurs in the behavior of the charge/discharge properties even in the relatively low voltage charging range of 3 to 4.25 V.

Examples 4-1 to 4-2 and Comparative Examples 4-1 to 4-3: Manufacture of Lithium Secondary Battery A mixture of natural graphite as a negative electrode active material, carbon black as a conductive material, and PVDF as a binder mixed in a 85:10:5 ratio by weight were mixed with a solvent, n-methylpyrrolidone, to prepare a composition for forming a negative electrode, and the composition was applied to a copper current collector to manufacture the negative electrode.

Porous polyethylene as a separator was disposed between a positive electrode listed in Table 5 below and the negative electrode to manufacture an electrode assembly, and after positioning the electrode assembly inside of a case, an electrolyte solution was injected into the inside of the case to manufacture a lithium secondary battery. Here, the electrolyte solution was prepared by dissolving 1.0 M lithium hexafluorophosphate $LiPF_6$ in an organic solvent composed of ethylene carbonate/dimethyl carbonate/ethylmethylcarbonate (EC/DMC/EMC mixing ratio by volume=3/4/3).

TABLE 5

| | Positive electrode |
|---|---|
| Example 4-1 | Example 2-1 |
| Example 4-2 | Example 2-2 |
| Comparative Example 4-1 | Comparative Example 2-1 |
| Comparative Example 4-2 | Comparative Example 2-2 |
| Comparative Example 4-3 | Comparative Example 2-3 |

Experimental Example 4-1: Evaluation of Lithium Secondary Battery Properties (1)

The lithium secondary batteries in Example 4-1, Example 4-2, Comparative Example 4-1, and Comparative Example 4-2 were charged/discharged for 800 cycles at 1 C/1 C conditions at high temperature (60° C.) under an operating voltage in the range of 2.8 to 4.15 V, and the high-temperature (60° C.) resistance, resistance increase ratio, and capacity retention after 800 cycles—that is, the ratio between the discharge capacity at the 800th cycle and the initial capacity—were each measured. The results are displayed in Table 6 below and FIG. 6.

Figure 6:
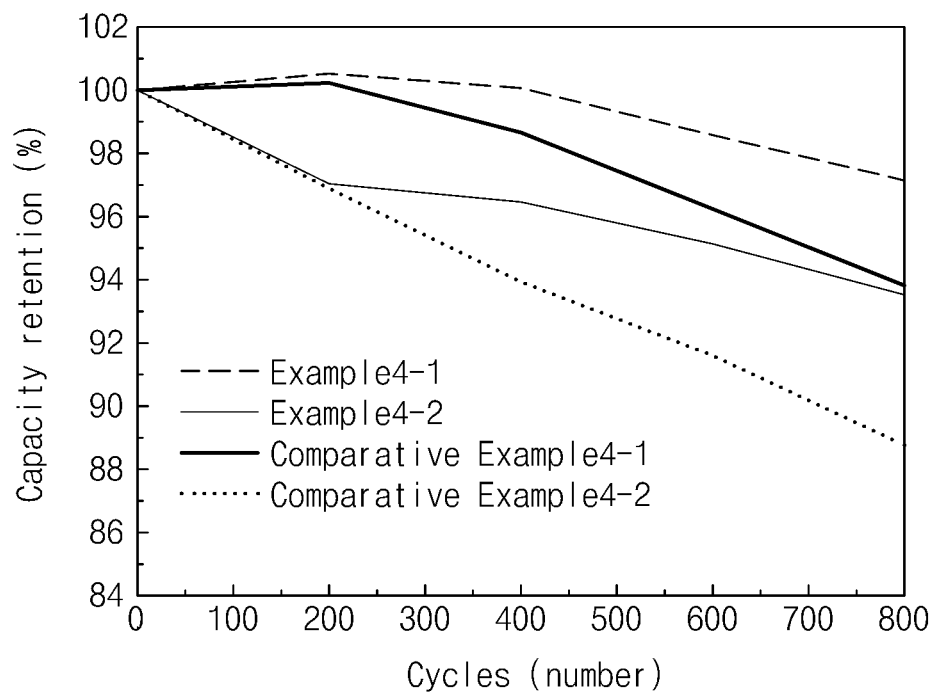
FIG. 6 is a graph displaying results from evaluating the high-temperature lifetime properties of lithium secondary batteries in Examples 4-1 and 4-2, and Comparative Examples 4-1 and 4-2.

FIG. 6 is a graph displaying the results from evaluating the high-temperature lifetime properties of batteries including the positive electrode active materials in Example 4-1, Examples 4-2, Comparative Example 4-1, and Comparative Example 4-2.

TABLE 6

| | High-temperature resistance (mΩ) | High-temperature resistance increase ratio (%) | High-temperature capacity retention after 800 cycles (%) |
|---|---|---|---|
| Example 4-1 | 1.696 | 122.2 | 97.13 |
| Example 4-2 | 1.676 | 124.0 | 93.48 |
| Comparative Example 4-1 | 1.692 | 124.5 | 93.92 |
| Comparative Example 4-2 | 1.808 | 135.0 | 88.67 |

Referring to Table 6, the lithium secondary batteries in Examples 4-1 and 4-2 exhibited better resistance and lifetime properties at high temperature than the lithium secondary batteries in Comparative Examples 4-1 and 4-2. The improvement was especially pronounced when compared to the lithium secondary battery in Comparative Example 4-2 including the positive electrode active material having the surface treatment layer composed of the Si-containing crystalline oxide.

Although the lithium secondary battery in Example 4-2 exhibited lower results than the lithium secondary battery in Comparative Example 4-1 with respect to high-temperature resistance and resistance increase ratio, a somewhat lower value for capacity retention was exhibited compared to Comparative Example 4-1. However, as may be seen in the graph displayed in FIG. 6, the capacity retention graph for the lithium secondary battery in Comparative Example 4-1 decreases sharply after 200 cycles, and may be expected to exhibit a much lower capacity retention value after 800 cycles than the lithium secondary battery in Example 4-2.

Experimental Example 4-2: Evaluation of Lithium Secondary Battery Properties (3)

After disassembling the lithium secondary batteries in Example 4-1, Example 4-2, Comparative Example 4-1, and Comparative Example 4-2 on which the lifetime test in Experimental Example 4-1 was performed, ICP analysis was performed on the positive electrodes to measure the amounts of metal eluted. The results are displayed in Table 7.

TABLE 7

|  | Ni (ppm) | Co (ppm) | Mn (ppm) |
| --- | --- | --- | --- |
| Example 4-1 | 10 | 10 | <5 |
| Example 4-2 | 10 | 7 | <5 |
| Comparative Example 4-1 | 40 | 30 | <5 |
| Comparative Example 4-2 | 135 | 100 | 20 |

Referring to Table 7 above, the amount of metal eluted in the lithium secondary batteries in Examples 4-1 and 4-2 including the positive electrode active material according to the present disclosure was significantly lower than the amount of metal eluted in the lithium secondary batteries in Comparative Examples 4-1 and 4-2. In particular, the difference in the amount of metal eluted was especially large when compared to the lithium secondary battery in Comparative Example 4-2 including the positive electrode active material having the surface treatment layer composed of the Si-containing crystalline oxide.

Experimental Example 4-3: Evaluation of Lithium Secondary Battery Properties (4)

The lithium secondary batteries in Example 4-1 and Comparative Example 4-3 were charged/discharged for 400 cycles at 1 C/1 C conditions at high temperature (45° C.) under an operating voltage of 4.35 V. The capacity retention—that is, the ratio between the discharge capacity at each cycle and the initial capacity—was measured, and the results are displayed in Table 8.

TABLE 8

|  | Example 4-1 | Comparative Example 4-3 |
| --- | --- | --- |
| Discharge capacity (mAh/g) | 190.4 | 126.3 |
| Discharge capacity retention (%) | 80.3 | 73.4 |

Referring to Table 8, in contrast to the lithium secondary battery in Example 4-1, in which the discharge capacity retention was 80.3% after 400 cycles, the discharge capacity retention of the lithium secondary battery in Comparative Example 4-3 was 73.4%. From this result, it may be seen that the high-voltage operation lifetime properties of the lithium secondary battery in Example 4-1 are vastly superior to those of the lithium secondary battery in Comparative Example 4-3.

By including a surface treatment layer composed of a B and Si-containing amorphous oxide, a positive electrode active material according to the present disclosure has reduced moisture reactivity and improved thermal and chemical stability, and thus may exhibit excellent lifetime properties and high-voltage stability. According the positive electrode active material is useful as a positive electrode active material for high-voltage batteries in which the voltage is at least 4.3 V.

What is claimed is:

1. A positive electrode active material for a secondary battery, the positive electrode active material comprising:
    a core including a lithium nickel manganese cobalt oxide; and
    a surface treatment layer positioned on the surface of the core, wherein the surface treatment layer includes a boron (B) and silicon (Si)-containing amorphous oxide.

2. The positive electrode active material of claim 1, wherein the surface treatment layer includes one or two or more selected from the group consisting of a borosilicate-based glass, an alkaliborosilicate-based glass, and an aluminoborosilicate-based glass.

3. The positive electrode active material of claim 1, wherein the surface treatment layer includes a borosilicate-based glass that includes $B_2O_3$ and $SiO_2$ in a 50:50 to 80:20 weight ratio.

4. The positive electrode active material of claim 1, wherein the surface treatment layer includes an alkaliborosilicate-based glass that includes $B_2O_3$, $SiO_2$, and $R_2O$ (where R is at least one alkali metal), and the alkaliborosilicate-based glass containing 1 to 20 parts by weight of $R_2O$ with respect to 100 parts by weight of the sum weight of $B_2O_3$ and $SiO_2$.

5. The positive electrode active material of claim 1, wherein the surface treatment layer includes an aluminoborosilicate-based glass that includes $B_2O_3$, $SiO_2$, and $Al_2O_3$, and the aluminoborosilicate-based glass containing 0.1 to 10 parts by weight of $Al_2O_3$ with respect to 100 parts by weight of the sum weight of $B_2O_3$ and $SiO_2$.

6. The positive electrode active material of claim 1, wherein the boron (B) and silicon (Si)-containing amorphous oxide glass in the surface treatment layer has a softening temperature of 1,100 to 1,300° C.

7. The positive electrode active material of claim 1, wherein the surface treatment layer is formed on at least 25% and less than 100% of the total surface area of the core.

8. The positive electrode active material of claim 1, wherein the surface treatment layer is formed to an average thickness ratio of 0.01 to 0.1 with respect to the radius of the core.

9. The positive electrode active material of claim 1, wherein the lithium nickel manganese cobalt oxide is doped with one or two or more elements selected from the group consisting of W, Mo, Zr, Ti, Mg, Ta, Al, Fe, V, Cr, Ba, Ca, and Nb.

10. The positive electrode active material of claim 1, wherein the core is a secondary particle assembled from primary particles.

11. The positive electrode active material of claim 1, wherein the core has an average particle diameter ($D_{50}$) of 1 to 20 μm.

12. The positive electrode active material of claim 1, wherein the BET specific surface area is 0.1 to 1.9 $m^2/g$ and the tap density is 1.5 to 3 g/cc.

13. The positive electrode active material of claim 1, wherein the positive electrode active material exhibits a lithium ion conductivity of at least $10^{-7}$ S/cm at 25° C.

14. A method for preparing the positive electrode active material for a secondary battery according to claim 1, the method comprising:
    a first operation for using a boron-containing raw material and a silicon-containing raw material to form a boron and silicon-containing amorphous oxide; and
    a second operation for mixing the amorphous oxide with a lithium nickel manganese cobalt oxide and then heat treating to form a surface treatment layer including the amorphous oxide on a core including the lithium nickel manganese cobalt oxide.

15. The method of claim 14, wherein the first operation is performed by mixing the boron-containing raw material with the silicon-containing raw material, melting at 1,000 to 1,800° C., and then cooling.

16. The method of claim 14, wherein the boron-containing raw material and the silicon-containing raw material are mixed in a 50:50 to 80:20 weight ratio.

17. The method of claim 14, wherein, in the first operation, a raw material including one or two or more elements selected from the group consisting of an alkali metal, aluminum, and a ceramic element is further added.

18. The method of claim 14, further comprising, following the first operation, an operation for milling the amorphous oxide to an average particle diameter of 100 to 500 nm.

19. The method of claim 14, wherein, in the second operation, the heat treatment is performed at a temperature of 300 to 600° C.

20. A positive electrode for a secondary battery, the positive electrode comprising the positive electrode active material according to claim 1.

* * * * *